No. 838,220. PATENTED DEC. 11, 1906.
R. H. STIMPLE.
MACHINE FOR SORTING SEED CORN.
APPLICATION FILED SEPT. 28, 1905.
3 SHEETS—SHEET 1.
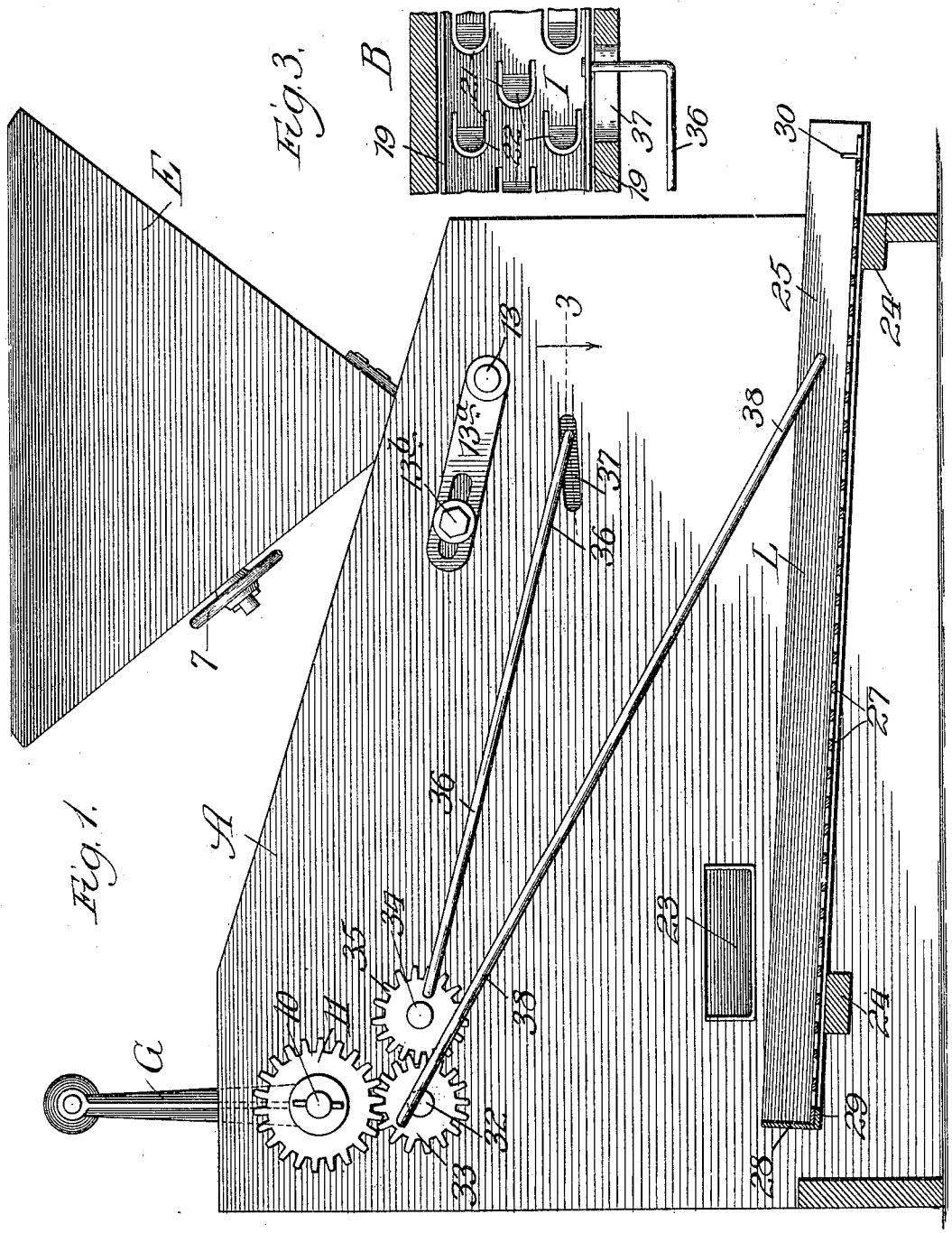
Witnesses:
Chas. E. Gaylord,
John Enders.
Inventor:
Ralph H. Stimple,
By Dyrenforth, Dyrenforth & Lee,
Attys.

No. 838,220. PATENTED DEC. 11, 1906.
R. H. STIMPLE.
MACHINE FOR SORTING SEED CORN.
APPLICATION FILED SEPT. 28, 1905.
3 SHEETS—SHEET 2.
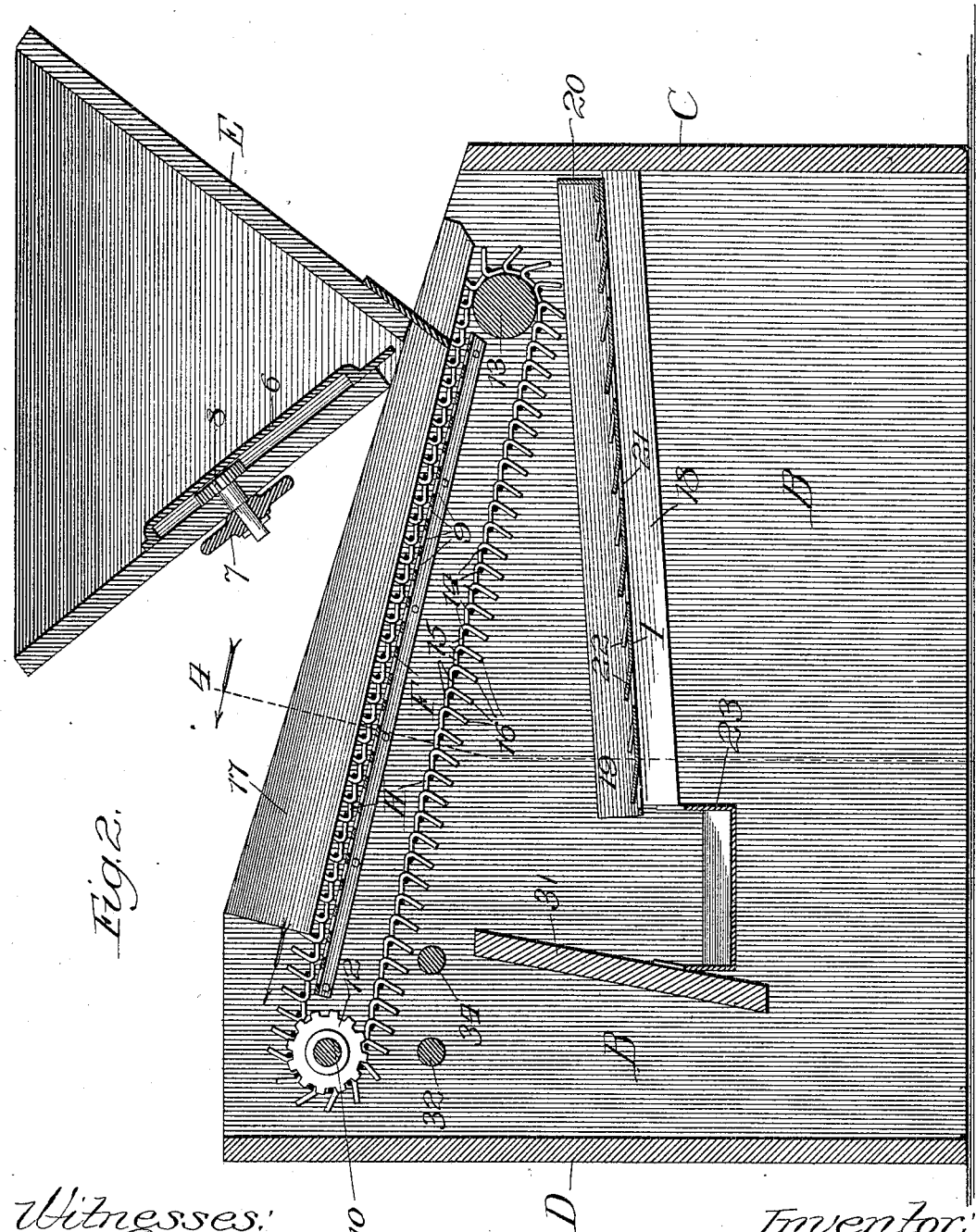

No. 838,220. PATENTED DEC. 11, 1906.
R. H. STIMPLE.
MACHINE FOR SORTING SEED CORN.
APPLICATION FILED SEPT. 28, 1905.
3 SHEETS—SHEET 3.
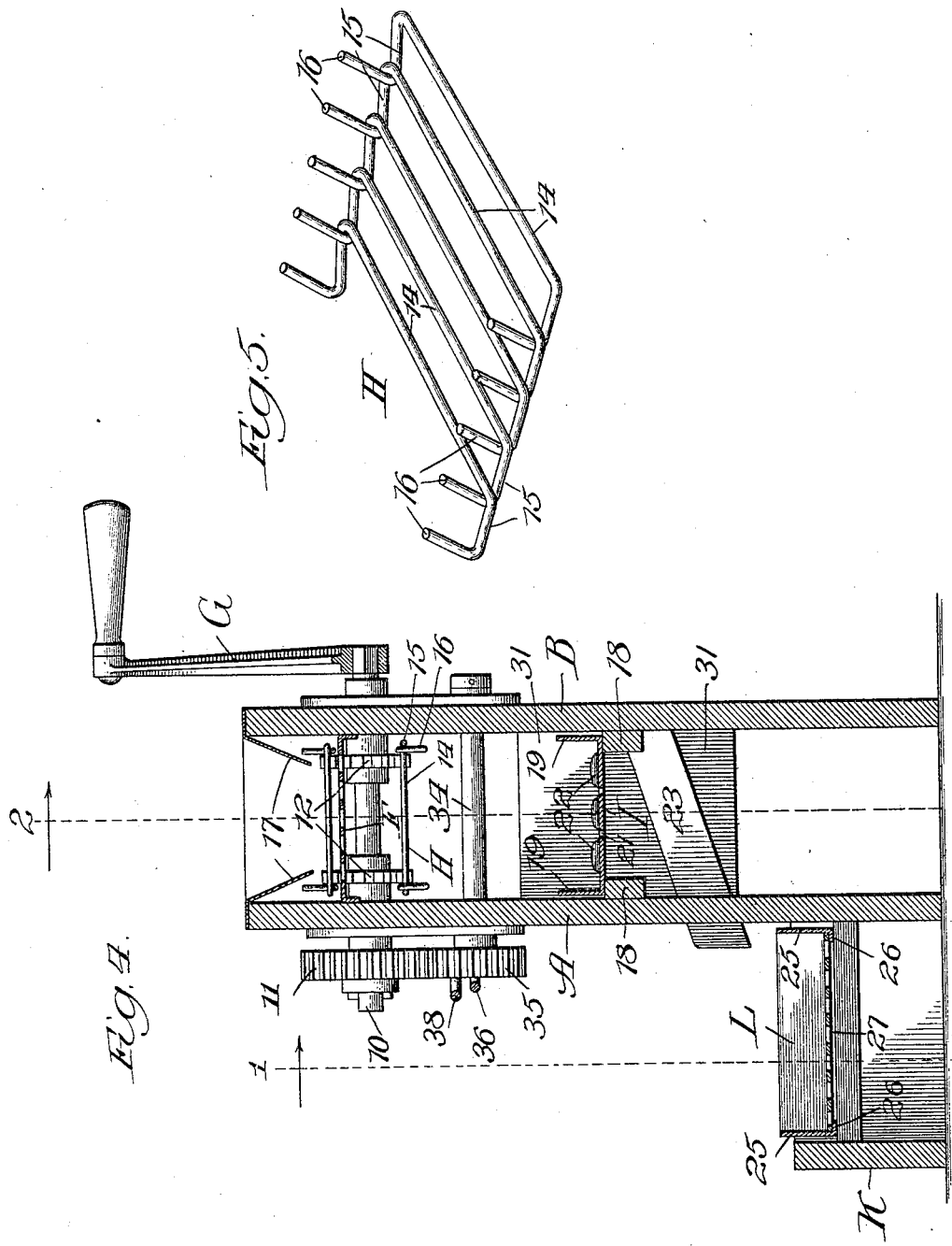
Witnesses:
Inventor:
Ralph H. Stimple,
By Dyrenforth, Dyrenforth & Lee,
Attys.

UNITED STATES PATENT OFFICE.

RALPH H. STIMPLE, OF BATAVIA, ILLINOIS.

MACHINE FOR SORTING SEED-CORN.

No. 838,220.          Specification of Letters Patent.          Patented Dec. 11, 1906.

Application filed September 28, 1905. Serial No. 280,465.

*To all whom it may concern:*

Be it known that I, RALPH H. STIMPLE, a citizen of the United States, residing at Batavia, in the county of Kane and State of Illinois, have invented a new and useful Improvement in Machines for Sorting Seed-Corn, of which the following is a specification.

It is desirable for the purpose of obtaining the best results in yield from planted seed-corn that the kernels selected for seed be of approximately uniform and medium size. The preferred kernels for use as seed are those which grow along the central portion of the cob, as tip-end kernels are too small and butt-end kernels too large to be desirable for the purpose.

My object is to provide a machine of simple, durable, and improved construction which will operate to select from shelled corn fed thereto those kernels best suited for seed.

In the accompanying drawings, Figure 1 is a partly-sectional side view of my improved machine, the section being taken on line 1 in Fig. 4; Fig. 2, a section taken on line 2 in Fig. 4; Fig. 3, a broken plan section taken on line 3 in Fig. 1; Fig. 4, a section taken on irregular line 4 in Fig. 1, and Fig. 5 a broken perspective view illustrating the construction of an endless belt or chain which I prefer to employ.

The side boards or cheeks A B and end boards C D form the main frame of the machine, which in practice may be a portable device less than two feet in length and so far as the main portion is concerned about four inches in width.

Fastened to the frame to extend above the end portion C thereof is a feed-hopper E, provided with a valve 6, adjustable by means of a thumb-wheel 7, pinion 8, and rack on the valve to regulate the feed of corn from the hopper. Mounted between the side boards and extending from beneath the lower end of the hopper in an upward-inclined direction is a stationary sifting-platform F, provided throughout with comparatively large perforations or openings 9. Beyond the upper end of the platform F is a shaft 10, provided beyond the side B with an operating-crank G and beyond the side A with a pinion 11. Just within the sides A B the shaft 10 carries sprocket-wheels 12. Just beyond the lower end of the platform F is a roller 13, journaled at opposite ends in slidably-adjustable bearings 13ᵃ, which are held in adjusted position by bolts 13ᵇ. Extending over and under the platform F and around the sprocket-wheels 12 and roller 13 is an endless chain H, formed of parallel slats, preferably in the form of metal rods 14, bent near their opposite ends to a right angle to form the parts 15, terminating in hook portions 16, which engage the next adjacent rods 14, as shown most clearly in Fig. 5. The upper stretch of the chain H moves in a plane slightly above and parallel with the platform F. Extending downward from the upper inner edges of the sides A B are guard plates or shields 17, which house the hook portions 16 of the chain, as indicated.

I is an oblong sifting tray or platform resting at opposite edge portions on guide-strips 18, fastened against the sides A B. The guide-strips extend from the end C in a slightly-downward-inclined direction for a distance somewhat greater than one-half the length of the device, and the tray or platform reciprocates thereon. The said tray or platform is formed with narrow side flanges 19 and a flange 20 at its upper end. The base of the tray is provided throughout with U-shaped recesses 21, forming tongues 22, which are slightly upturned, as indicated. Just beyond the lower end of the tray I is a transverse downward-inclined chute 23, extending at its lower end through the wall A. The ends C D at their lower portions extend beyond the side A, and fastened thereto is a side strip K. Extending between the side A and strip K are cross-pieces 24, located as shown, upon which rests an oblong sifting-tray L  The tray L extends in a slightly-downward-inclined direction beyond the end C and is formed with narrow sides 25, having inturned flanges 26, which receive a removable platform 27, provided throughout with perforations. The tray is provided at its upper end with an end piece 28, having a flange 29, upon which the adjacent end of the platform 27 rests, and at the opposite sides of the lower end of the tray are short angle-pieces 30, against which the lower end of the platform 27 abuts. Extending between the sides A B beyond the chute 23 is a slightly-inclined board 31, forming, with the end D, a chute.

Journaled on the shaft 32 is a pinion 33, meshing with the pinion 11, and journaled on the shaft 34 is a pinion 35, meshing with the pinion 33. A connecting-rod 36 is eccentrically and pivotally fastened to the pinion 35 at one end and bent at its opposite end to pass through a slot 37 in the side A where it is connected with one side of the tray I. A connecting-rod 38 is fastened at one end pivotally and eccentrically to the pinion 33 and at its opposite end to one side of the tray L. Turning of the crank G in the positive direction rotates the shaft 10 to cause the chain H to travel in the direction of the arrow in Fig. 2 and turn the pinions 33 35 to reciprocate the trays I L.

In practice the corn fed from the hopper E drops upon the platform F and is moved by the chain H in the direction of the shaft 10. The openings or perforations 9 need be but little if any larger than necessary to permit the passage through them of the kernels of the largest size which it is desired to employ as seed-corn. Therefore cob ends and other trash larger or longer than kernels, which may be mixed with the corn, are moved by the chain to the upper end of the platform F and there discarded by being discharged through the chute formed by the wall D and cross-piece 31. Those kernels which are small enough to sift through the openings 9 drop upon the reciprocating tray I. The action of the tray I is such that those kernels which are too thin to be desirable for seed will drop through the openings 21 and are discarded, while those kernels which are not too thin are moved along to the chute 23 and discharged thereby into the tray L. A plate or platform 27 is provided, having openings which will admit the passage through them and cause the discarding of kernels which are smaller than desired. Consequently those kernels which are discharged from the end of the reciprocating tray L will be of proper size, both as to thickness and width, for seed-corn.

The plate 27 is removable, as stated, so that it may be readily replaced with another plate having openings somewhat larger or smaller, as desired, depending upon the particular character of the corn operated upon.

All the kernels which are discarded fall into or through the base of the casing and may be saved for other purposes than seed-corn.

What I regard as new, and desire to secure by Letters Patent, is—

1. In a connected machine for sorting seed-corn, sifting mechanism including an endless slat conveyer and a fixed platform beneath said conveyer and perforated to obtain the separation from the corn and trash of seed and thinner and smaller kernels, a vibratory tray beneath said platform and receiving said separated kernels and having openings formed for the passage therethrough of said thinner and smaller kernels, and means for collecting the separated kernels.

2. In a connected machine for sorting seed corn, sifting mechanism including an inclined traveling slat conveyer and a fixed inclined platform beneath said conveyer and perforated to obtain the separation from the corn and trash of seed and thinner and smaller kernels, an oppositely-inclined vibratory tray beneath said platform and receiving said separated kernels and having openings formed for the passage therethrough of said thinner and smaller kernels, a chute receiving the separated seed-kernels from said tray, and a vibratory tray into which said chute delivers.

RALPH H. STIMPLE.

In presence of—
S. H. STIMPLE,
ARTHUR L. STIMPLE.